Figure 1:
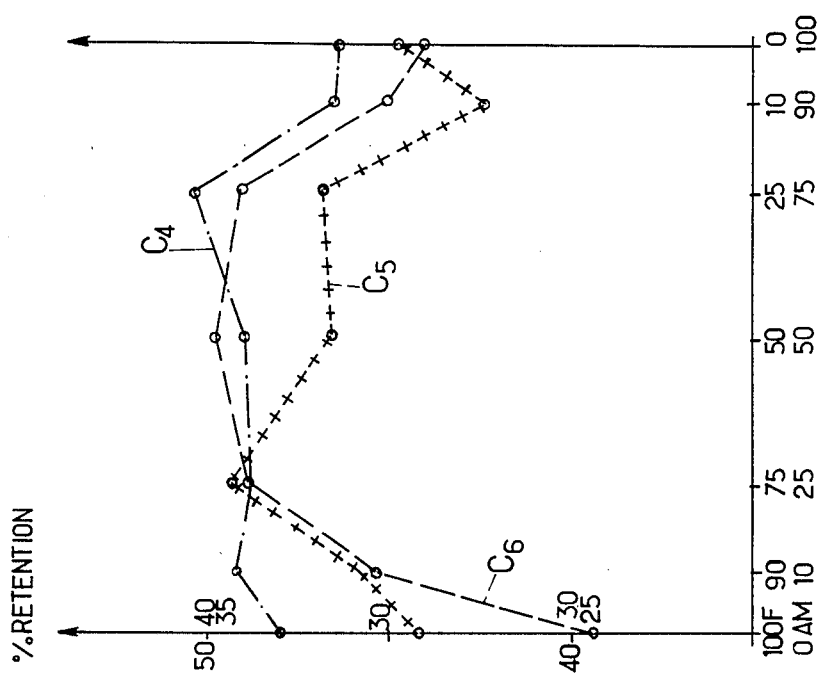

United States Patent [19]

Huchette et al.

[11] Patent Number: 4,613,407
[45] Date of Patent: Sep. 23, 1986

[54] CATIONIC ADDITIVE FOR THE MANUFACTURE OF PAPER

[75] Inventors: Michel Huchette; Guy Fleche, both of Merville; Serge Gosset, Lestrem, all of France

[73] Assignee: Roquette Freres, Lestrem, France

[21] Appl. No.: 665,261

[22] Filed: Oct. 26, 1984

[30] Foreign Application Priority Data

Oct. 27, 1983 [FR] France ................................ 83 17186

[51] Int. Cl.⁴ ............................................... D21H 3/28
[52] U.S. Cl. ..................................... 162/175; 106/210
[58] Field of Search ......................... 162/175; 106/210

[56] References Cited

U.S. PATENT DOCUMENTS 3,770,472  11/1973  Jarowenko ........................ 162/175

*Primary Examiner*—Peter Chin
*Attorney, Agent, or Firm*—Fleit, Jacobson, Cohn & Price

[57] ABSTRACT

Wet-end cationic additive for the manufacture of paper, comprising a mixture of at least one cationic cereal starch and at least one cationic tuber starch.

13 Claims, 3 Drawing Figures

CATIONIC ADDITIVE FOR THE MANUFACTURE OF PAPER

The invention relates to a novel wet-end cationic aid for the manufacture of paper. It also relates to the process for preparing this additive, the process for preparing paper employing this additive as well as the paper so obtained.

The use of cationic starches in the manufacture of paper has long been known. The employment of these starches enables essentially an increase in the retention of the fibres and of the fillers, and an improvement in draining and in increase of the physical properties of the paper.

These cationic starches are prepared by the reaction of the starch molecule with reagents enabling the appearance of a positive charge. The chemical bond may be of the ether or the ester type, but generally the ether linkage is preferred considering its better stability.

The majority of cationic starches marketed at the present time are prepared by means of reagents containing nitrogen. The reagent used may be based on a primary, secondary or tertiary amine or on a quaternary ammonium salt. The primary and secondary amines are however considered as presenting little interest for paper applications and it is hence essentially the tertiary amines and the quaternary ammonium salts which are used.

Typical cationisation reagents for the starch are halohydrins or epoxides corresponding to the following formulae:

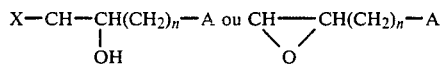

where A represents the groups

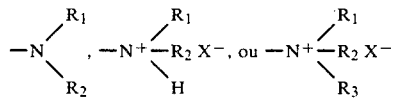

where X represents an halogen atom, where $R_1$ and $R_2$ each represent independently of one another a straight or branched chain alkyl radical with $C_1$–$C_4$ or are joined into a ring structure, where $R_3$ represents an alkyl radical with a straight or branched chain of $C_1$–$C_4$, and where n represents a number from 1 to 3.

The cationic starches may sometimes also be "amphoterised" by introduction onto the starch of anionic substituents, such an amphoterisation being well known to reduce the sensitivity with respect to the pH.

The anionic groups most used are present in the form of phosphate or phosphonate groups.

The cationisation reaction of the starch may be carried out either in aqueous phase, the starch being in granular form or in gelatinized form or in a dry phase. Generally, the reaction is carried out in an aqueous phase in the presence of alkaline agents, the starch being in granular form. The cationic starch obtained by this process must then undergo a cooking operation—generally in a continuous cooker under pressure which ensures the proportioning of ingredients, the cooking and the dilution—before being sent to the paper machine.

The cationisation has been carried out and described with respect to starches of any origin such as those of corn, waxy starch, rice, wheat, potato, manioc. More or less appreciable differences in behavior, as a function particularly of the cellulose pulps and aqueous media used, have been observable but it is generally cationic potato starch which is recognised as contributing the best performance, the cationic starches of cereals generally showing slightly lower performance.

The researches carried out by Applicants have permitted the discovery that still better results could be achieved, especially as far as retention is concerned.

Applicants observed in fact that, surprisingly and unexpectedly, the mixture of at least one cereal starch and at least one cationic tuber starch showed performances as additive in the manufacture of paper superior to those of an equivalent quantity of cationic cereal starch or cationic tuber starch, taken separately.

It follows that the novel wet-end cationic aid for the manufacture of paper, in accordance with the invention, is characterized by the fact that it comprises a mixture of at least one cereal starch and at least one cationic tuber starch.

Applicants have observed that the synergy appearing between the cationic cereal starches and the cationic tuber starches was obtained as soon as the content of cationic cereal starch in the mixture was comprised between 2% and 98% by weight, preferably between 5% and 95% and, still more preferably, between 10 and 90%. Within these limites, in fact, the performances of the composition comprising cationic cereal starch and tuber starch, as measured, for example, by means of the "Britt-Jar" dynamic retention test (which will be discussed below) are superior to those which could be expected by simple addition of the individual performances of the cationic cereal starches and of the cationic tuber starches.

The optimum content in cereal starches of the cationic additive according to the invention, that is to say that permitting the best performance, is determined within the indicated limits, as a function particularly of the cellulosic pulp used, of the aqueous medium employed (ionic environment) or of the particular characteristics of each paper machine.

In order to prepare the wet-end cationic additive for the manufacture of the paper according to the invention, a mixture of at least one cereal starch and at least one tuber starch is cationised.

Preferably however, the tuber starches, on the one hand, and the cereal starches, on the other hand, are cationised separately, and then brought together by mixing either in dry state, or in a milk phase, or by mixing the aqueous concentrated or dilute glues prepared starting from these cationic starches.

Finally, the process of manufacturing paper according to the invention is characterized by the fact that there is added to the cellulose pulp intended for the manufacture of the paper a proportion of 0.1% to 4% of the cationic additive according to the invention, this percentage being expressed as dry additive with respect to the production by weight of the paper, the cationic additive being introduced in the form of dilute aqueous glue, of concentration less than 2% and, preferably, less than 1%.

The invention also relates to other features which are preferably used at the same time and which will be more explicitly considered below.

And it will, in any case, be well understood by means of the additional description which follows and of the examples.

Accordingly in order to manufacture the wet-end cationic additive of the invention, the procedure is as follows or in equivalent manner.

The mixing of at least one cereal starch, preferably selected from among wheat and corn starches, and at least one tuber starch, preferably potato starch, is carried out and the cationisation reaction is effected on this mixture.

Preferably, however, the cationisation of the tuber starches, on the one hand, and of the cereal starches, on the other hand, is done separately, the mixture of the cationic starches so obtained then being effected either by mixing dry, or in a milk phase, or by mixing concentrated or dilute aqueous glues prepared from these cationic starches.

The proportion of tuber starch present in the mixture is selected comprised between 2% and 98% by weight, preferably between 5% and 95% and, still more preferably, between 10 and 90%, in order to obtain the desired synergic effect, but as previously mentioned, this proportion could be optimized within these limits, as will emerge from the examples, as a function particularly of the cellulosic pulp used, of the aqueous medium employed and of the characteristics of the paper machine on which the application is done.

The cationisation reaction may be carried out in a manner known in itself, by means of cationic reagents such as described, for example, in "Starch Chemistry and Technology—Volume II—chapter XVI—R. L. WHISTLER and E. F. PASCHALL—Academic Press (1967)". The reaction may be carried out in an aqueous phase, the starch being in granular form or in gelatinised form, or in dry phase, the conditions of temperature, of time and of catalysis being well known to the technician skilled in the art.

Preferbly however, the cationisation reaction is carried out in an aqueous phase, the starch being in granular form, in an alkaline medium and with nitrogenous reagents based on tertiary amines or quaternary ammonium salts. Amont these reagents, it is preferred to use 2-dialkylaminochlorethane hydrochlorides such as 2-diethylaminochlorethane hydrochloride or glycidyl-trimethylammonium halogenides and their halohydrins such as N-(3-chloro-2-hydroxypropyl)-trimethylammonium chloride, the latter reagent being preferred.

The ratios of reagent employed are then selected to that the resulting cationic starches have a ratio of fixed nitrogen higher than 0.10% and preferably, higher than 0.15%, the upper limit being in practice close to 1%; the above said percentages are expressed on dry starch.

The cationic starches, and especially cereal starches, may also be amphoterised, this in order particularly to improve their performance in an acid medium.

Finally, as regards the preparation of the cationic additive glue according to the invention, the latter may be carried out, in a manner known in itself, by batchwise or continuous cooking, for example in a continuous cooker under pressure adapted to ensure the operations of proportioning, of cooking and of dilution.

The following examples enable the invention to be better explained.

METHOD OF EVALUATING THE PERFORMANCE OF THE CATIONIC PRODUCTS

In order to evaluate the performance of the cationic starches used as well as of the cationic additives according to the invention, the so-called "Dynamic Retention Jar", method employing the device known under the name "Britt-Jar", was used.

The paper pulp is an aqueous suspension of cellulose fibres of different sizes often mixed with other particles such as pigment fillers. The water may also contain other dissolved substances, present naturally or added to modify the composition of the pulp.

The colloidal properties or the hydrodynamic stability of the preparation have important consequential effects on the manufacture of the paper, for example, on the retention of cellulose fines and of the filler during the fabrication of the sheet and on the drainage speed of water through the sheet. Uniformity of distribution of the fibres in the sheet and the distribution of the fines are also effected. In the paper machine, the formation of the sheet is done under certain conditions of agitation causing high turbulence, having a tendency to entrain the fine particles through the gauze into the water beneath the gauze. As a result the methods of fabricating paper currently used in the laboratory where the agitation is low or deliberately absent, do not enable the behavior on the industrial paper machine to be predicted.

The Britt-Jar dynamic device enables the paper pulp to be studied at the laboratory level and under controlled and variable conditions of agitation, more representative of industrial conditions.

For the description and the method of use of this apparatus, reference may be made to the following publications:

TAPPI, October 1983, volume 56, No. 10, p. 46–50,
TAPPI, February 1976, volume 59, No. 2, p. 67–70,
TAPPI, July 1977, volume 60, No. 7, p. 110–112,
TAPPI, November 1978, volume 61, No. 11, p. 108–110.

EXAMPLE 1

For a first series of tests, there was sampled, on an industrial machine, a pulp of the so-called acid medium type, whose characteristics were as follows:

Concentration of pulp in fibrous material (obtained by filtration): 8.02 g/kg
Acidity: 120 ppm
Resistivity of the suspension: 952 ohms
Solubles: 1.1 g/l
Ashes: 1.75 g/l.

The acidity was measured by carrying out simple titration from an N/10 sodic solution with, as colored indicator, phenolphthalein.

There was studied, on the one hand, cationic potato starch having a fixed nitrogen to dry matter ratio equal to 0.23% and on the other hand, a cationic wheat starch having a fixed nitrogen to dry matter ratio equal to 0.20%, these products having been prepared by separate cationisation, in a granular aqueous phase, in an alkaline medium and by reaction with the N-(3-chloro-2-hydroxypropyl)-trimethylammonium chloride (called below CHTA).

There were also considered two cationic additives according to the invention, prepared by mixing in the dry state:

50% of cationic potato starch and 50% of cationic wheat starch,
25% of cationic potato starch and 75% of cationic wheat starch.

Each of these products was solubilized in a continuous cooking apparatus, under the following conditions:
milk with 10% commercial material, temperature: 120° C., under sufficient pressure for cooking to take place in liquid phase,
dwell time: 30 seconds,
line dilution at a concentration of 2% of dry matter measured on the refractometer, by cold water, the resulting product being thus brought to 40° C.

The BROOKFIELD viscosities, measured by means of the No. 2 spindle, after passage through a centrifugal pump permitting the reproduction of the conditions of distribution on the paper machine, are collected in Table I below:

TABLE I

|  | 40° C. | | 25° C. | |
| --- | --- | --- | --- | --- |
|  | 20 rpm | 100 rpm | 20 rpm | 100 rpm |
| Cationic potato starch | 30 cp | 44 cp | 36 cp | 52 cp |
| Cationic wheat starch | 80 cp | 50 cp | 70 cp | 66 cp |
| Mixture 50–50 | 48 cp | 52 cp | 60 cp | 64 cp |
| Mixture 25–75 | 60 cp | 50 cp | 66 cp | 66 cp |

The operation, for the Britt-Jar tests, was carried out on the proportion of 0.25% of dry cationic product with respect to the dry matter content of the pulp.

The agitator used in the Britt-Jar apparatus was subjected to three different speeds of rotation: 500 rpm, 750 rpm and 1000 rpm.

Under these various conditions, the retention of fine particules was measured (expressed in percent with respect to the proportion of initial fines which was 19.6% in the present case) and the results are collected in the Table II.

TABLE II

|  | RETENTION ON BRITT-JAR | | |
| --- | --- | --- | --- |
|  | 500 rpm | 750 rpm | 1000 rpm |
| Cationic potato starch | 39.7 | 24.4 | 19.8 |
| Cationic wheat starch | 32.8 | 21.5 | 16.7 |
| Mixture 50–50 | 35.9 | 24.2 | 18 |
| Mixture 25–75 | 40.9 | 24.3 | 19.7 |

The results collected in this table are illustrated by FIG. 1, in which there is shown the variation of the retention (in %) as a function of the content of cationic wheat starch in the mixture for speeds of 500 rpm (graph or curve $C_1$), 750 rpm (graph $C_2$) and 1000 rpm (graph $C_3$), the numerical values used being those of Table II.

The mixture with 25% of cationic potato starch and 75% of cationic wheat starch appears particularly interesting and establishes the synergy involved.

EXAMPLE 2

Another industrial pulp, also of the "acid medium" type was used in this example. Its various characteristics are:
solubles: 1.20 g/l
ashes: 1.95 g/l
resistivity: 832 ohms
pH: 4.2
acidity: 105 ppm
proportion of fines (without agent): 21.2%
concentration of fibrous matter: 8.51 g/kg.
For these tests:
a cationic potato starch having a fixed nitrogen to dry matter ratio of 0.25%
a cationic corn starch having a fixed nitrogen to dry matter ratio of 0.23%
were used, these two starches having been prepared by separate cationisation, in a granular aqueous phase, by means of CHTA.

The following cationic additives were then prepared by mixing these two cationic starches:
90% cationic potato starch + 10% cationic corn starch
75% cationic potato starch + 25% cationic corn starch
50% cationic potato starch + 50% cationic corn starch
25% cationic potato starch + 75% cationic corn starch
10% cationic potato starch + 90% cationic corn starch.

The various products obtained were introduced in the form of a milk of 10% of commercial matter and treated in a continuous cooking apparatus for 30 seconds at 120° C.

At the outlet of the cooker, a dilution with cold water followed, to bring the glue obtained to 2% of dry matter measured on the refractometer and at about 40° C.

The colloidal solution thus obtained was subjected then to passage through a centrifugal pump so as to reproduce the conditions of distribution on the paper machine, generating high turbulence of the glue.

The brookfield viscosities (spindle No. 2), after these treatments, are collected in table III.

TABLE III

|  | 40° C. | | 25° C. | |
| --- | --- | --- | --- | --- |
|  | 20 rpm | 100 rpm | 20 rpm | 100 rpm |
| PS | 30 cp | 48 cp | 40 cp | 60 cp |
| CS | 76 cp | 60 cp | 110 cp | 76 cp |
| 90 PS 10 CS | 32 cp | 52 cp | 50 cp | 62 cp |
| 75 PS 25 CS | 30 cp | 48 cp | 44 cp | 58 cp |
| 50 PS 50 CS | 34 cp | 48 cp | 50 cp | 58 cp |
| 25 PS 75 CS | 38 cp | 44 cp | 46 cp | 76 cp |
| 10 PS 90 CS | 56 cp | 56 cp | 80 cp | 68 cp |

PS: cationic potato starch
CS: cationic corn starch.

The various products, in the form of a dilute glue were added at a ratio of 0.25% of dry product with respect to the dry matter of the pulp.

The retention of fines on the Britt-Jar dynamic operation was measured at three speeds of stirring: 500, 750 and 1000 rpm.

The results are collected in the following Table IV.

TABLE IV

|  | RETENTION BRITT-JAR | | |
| --- | --- | --- | --- |
|  | 500 rpm | 750 rpm | 1000 rpm |
| Cationic potato starch | 48 | 34.2 | 24.4 |
| Cationic corn starch | 46.4 | 34.8 | 29.1 |
| 90% PS 10% CS | 49.2 | 35.8 | 30.4 |
| 75% PS 25% CS | 48.8 | 39.3 | 33.9 |
| 50% PS 50% CS | 49 | 36.6 | 34.8 |
| 25% PS 75% CS | 50.4 | 36.9 | 34.1 |
| 10% PS 90% CS | 46.5 | 32.3 | 30.1 |
| Pulp without retention agent | 38.8 | 27.1 | 2.3 |

Figure 2:
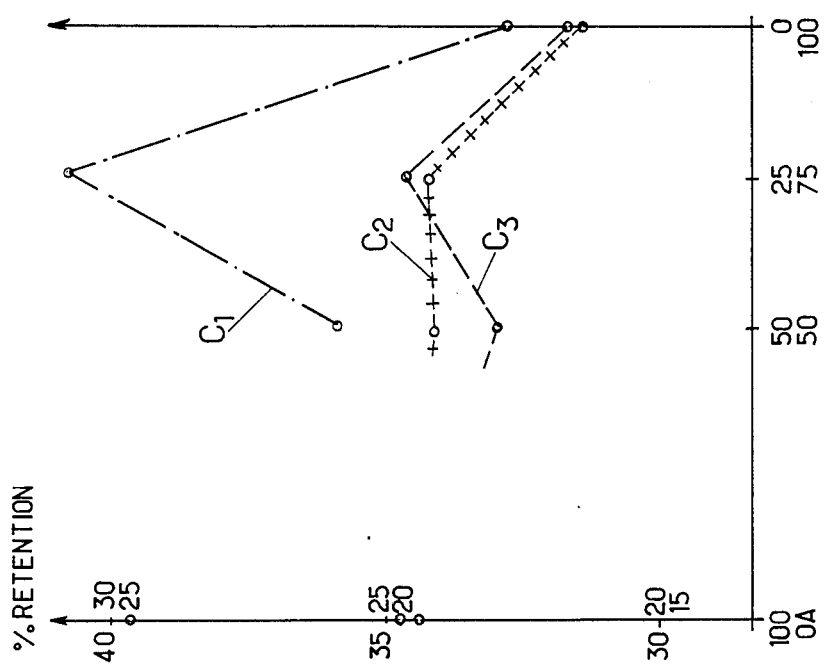

The results collected in this table are illustrated by FIG. 2 in which the graphs $C_4$, $C_5$ and $C_6$ represent respectively the variation of the retention (in %) as a function of the content of cationic corn starch for speeds of 500, 750 and 1000 rpm.

The synergy is particularly distinct at 1000 rpm, but also exists at the 500 and 750 rpm.

It is therefore observed that it is possible to improve the retention of the fines very substantially by using the cationic additives according to the invention.

EXAMPLE 3

The so-called neutral medium pulps, that is to say filled essentially with calcium carbonate, have taken an unquestionable importance in the paper industry.

There are numerous cases of employing cationic starch material in a pulp without aluminum sulfate, with pH values comprised between 7 and 8.5.

This is why a pulp of this type was also studied with the same products as those used in examples 1 and 2.

The preparation of the glues was carried out, as previously, for 30 seconds at 120° C. on a milk with 10% of commercial material, with line dilution so as to bring the glue to 2% of dry matter and about 40° C. The glues thus obtained were subjected to passage in a centrifugal pump before being added to the pulp.

The values of the BROOKFIELD viscosities (spindle No. 2) are collected in Table V.

TABLE V

| | 40° C. | | 25° C. | |
|---|---|---|---|---|
| | 20 rpm | 100 rpm | 20 rpm | 100 rpm |
| Cationic potato starch | 26 cp | 44 cp | 35 cp | 52 cp |
| Cationic corn starch | 160 cp | 84 cp | 180 cp | 96 cp |
| 90 PS 10 CS | 30 cp | 44 cp | 40 cp | 52 cp |
| 75 PS 25 CS | 40 cp | 52 cp | 50 cp | 60 cp |
| 50 PS 50 CS | 34 cp | 48 cp | 54 cp | 58 cp |
| 25 PS 75 CS | 52 cp | 56 cp | 60 cp | 60 cp |
| 10 PS 90 CS | 90 cp | 60 cp | 120 cp | 80 cp |

The pulp itself had the following characteristics:
solubles: 0.82 g/l
resistivity: 2640 ohms
pH: 7
ashes: 1.82
concentration of fibrous matter: 8.24 g/kg
ratio of fines: 27.2%.

The various cationic products were added in the proportion of 0.25% of dry matter with respect to the dry matter of the pulp.

Figure 3:
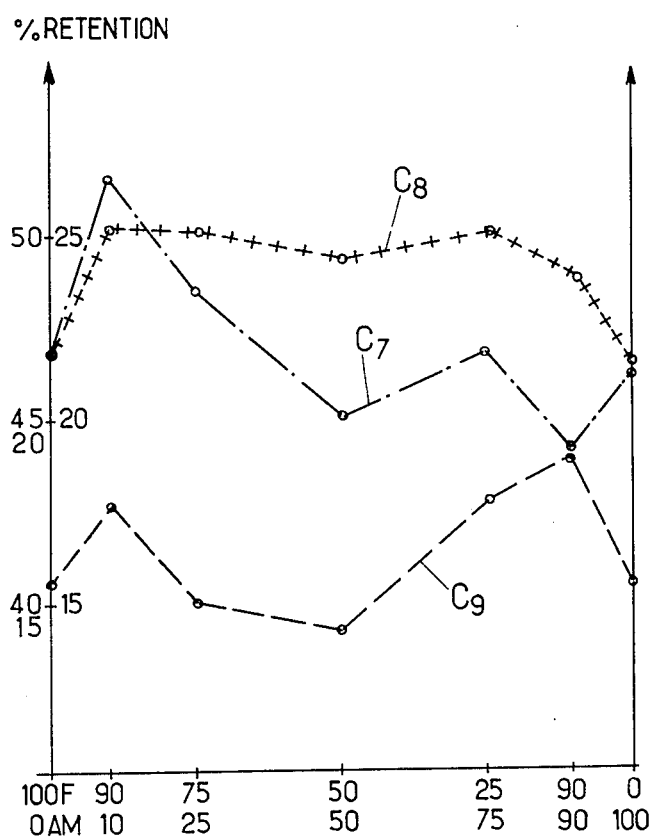

The results obtained are collected in Table VI as well as in FIG. 3.

TABLE VI

| | BRITT-JAR RETENTION (%) | | |
|---|---|---|---|
| | 500 rpm | 750 rpm | 1000 rpm |
| Cationic potato starch | 46.7 | 21.9 | 15.5 |
| Cationic corn starch | 46.2 | 21.8 | 15.6 |
| 90% PS 10% CS | 51.7 | 25.3 | 17.7 |
| 75% PS 25% CS | 48.5 | 25.2 | 15.1 |
| 50% PS 50% CS | 45.1 | 24.5 | 14.3 |
| 25% PS 75% CS | 46.9 | 25.3 | 17.8 |
| 10% PS 90% CS | 44.2 | 24.1 | 19 |

TABLE VI-continued

| | BRITT-JAR RETENTION (%) | | |
|---|---|---|---|
| | 500 rpm | 750 rpm | 1000 rpm |
| Pulp alone | 29 | 14.5 | 3.4 |

(Row label: 90% CS / Pulp alone)

The results collected in this table are illustrated by FIG. 3 in which the graphs $C_7$, $C_8$ and $C_9$ represent respectively the variation in retention (in %) as a function of the content in cationic corn starch for speeds of 500, 750 and 1000 rpm.

The examination of Table VI and FIG. 3 shows that synergy exists also in a neutral medium. The most favourable percentages are variable as a function of the speed of rotation. At 500 rpm, the optimal performances are obtained with the additive constituted by 90% of cationic starch and 10% of cationic corn starch.

At 750 rpm, the existence of a plateau between 90-10 and 20-75 is observed.

At 1000 rpm, the optimum is situated around the point of 10% of potato starch-90% of corn starch.

EXAMPLE 4

This example establishes a comparison between separate cationisation of tuber starches and cereal starches and cationisation carried out on the mixture of the two types of starches.

The cationisation reagent used is the same as in the preceeding examples and the reaction is again carried out in an aqueous phase and in an alkaline medium, the starch products being in granular form.

By separate cationisation, a cationic potato starch was obtained having a fixed nitrogen to dry matter ratio equal to 0.25% and a cationic corn starch having a fixed nitrogen to dry matter ratio equal to 0.22%.

These two cationic starches were then mixed in the proportion of 25 parts by weight of cationic potato starch and 75 parts by weight of cationic corn starch. The nitrogen ratio of the cationic additive thus obtained was 0.23%.

In parallel, cationisation followed of a mixture of 25 parts by weight of potato starch and 75 parts by weight of corn starch. The ratio of nitrogen fixed to dry matter obtained is equal to 0.2%.

The two cationic additives thus prepared were then compared as far as their performances are concerned.

For this, the preparations of the glues were carried out as in the preceeding examples: milk with 10% commercial matter, cooking at 120° C. for 30 seconds, line dilution to 2% of dry matter and passage through a centrifugal pump.

The viscosities measured after this treatment on the Brookfield viscosimeter (spindle No. 2) are collected in Table VII.

TABLE VII

| | 40° C. | | 25° C. | |
|---|---|---|---|---|
| | 20 rpm | 100 rpm | 20 rpm | 100 rpm |
| 25 PS–75 CS separate cationisation | 42 | 50 | 100 | 52 |
| 25 PS–75 CS mixed cationisation | 48 | 52 | 100 | 64 |

The glues obtained were then added to a fibrous suspension sampled on an industrial machine. This pulp was of the so-called neutral medium type, filled with calcium carbonate and not including aluminum sulfate. Its characteristics were as follows:
solubles: 0.67 g/l
resistivity: 2730 ohms
pH: 7.3
ashes: 2.15 g/l
concentration of fibrous matter: 8.27 g/l
ratio of fines: 28.8%.

The amounts introduced corresponded to 0.25% of dry cationic starch material with respect to the dry matter of the pulp.

The Britt-Jar apparatus was then used as in the preceeding examples.

The results are presented in Table VIII.

TABLE VIII

|  | RETENTION ON BRITT-JAR (%) | | |
| --- | --- | --- | --- |
|  | 500 rpm | 750 rpm | 1000 rpm |
| 25 PS–75 CS separate cationisation | 49.3 | 28.1 | 19 |
| 25 PS–75 CS mixed cationisation | 49.6 | 27.3 | 21.4 |
| Pulp alone | 16.2 | 6.1 | 1 |

In this case and particularly with the cellulosic pulp used, very little difference was observed at the level of performance between the cationic additive prepared by separate cationisation and that prepared by cationisation on the mixture.

The performances of these additives are however very much superior to those of the cationic potato starch alone which gives retention percentages respectively equal to 42.7%, 26.6% and 14.6% for speeds of 500, 750 and 1000 rpm.

EXAMPLE 5

The cationic products are those of example 4.

The pulp is a pulp sampled in an industrial medium; the characteristics thereof were as follows:
solubles: 1.10 g/l
resistivity: 910 ohms
pH: 7
ashes: 2.40 g/l
concentration of fibrous matter: 8.17 g/kg
ratio of fines: 23.8%.

The ratio of introduction is 0.25% of dry cationic product with respect to the dry matter of the pulp.

The results of the retention tests are presented in Table IX.

TABLE IX

|  | RETENTION BRITT-JAR (%) | | |
| --- | --- | --- | --- |
|  | 500 rpm | 750 rpm | 1000 rpm |
| 25 PS–75 CS separate cationisation | 47.6 | 21.7 | 18.5 |
| 25 PS–75 CS mixed cationisation | 48.7 | 18.3 | 10.8 |
| Pulp alone | 29 | 12.4 | 7.6 |

Contrary to the preceeding example, there is noted in this case the superiority of performances for the additive prepared by separate cationisation, very particularly at the speed of 1000 rpm.

As is self-evident and as emerges besides moreover from the foregoing, the invention is in no way limited to those of its types of application and embodiments which have been more particularly envisaged; it encompasses on the contrary all modifications.

We claim:

1. Wet-end cationic starch additive for the manufacture of paper comprising a mixture of
between from about 2% to about 98% by weight of the mixture of at least one cationic cereal starch; and
between from about 98% to about 2% by weight of the mixture of at least one cationic tuber starch; said mixture containing an amount of fixed nitrogen greater than about 0.1% based on the dry matter of the starch mixture.

2. The additive of claim 1 comprising from between about 5% to about 95% of the cationic cereal starch by weight of the mixture.

3. The additive of claim 2 comprising from between about 10% to about 90% of the cationic cereal starch by weight of the mixture.

4. The additive of claim 3 comprising between from about 25% to about 75% of the cationic cereal starch by weight of the mixture.

5. The additive of claim 4 comprising about 50% of the cationic cereal starch by weight of the mixture.

6. The additive of claim 1 wherein the cereal starch is selected from the group consisting of wheat starch and corn starch.

7. The additive of claim 1 wherein the tuber starch is potato starch.

8. The additive of claim 1, wherein the starches are cationized with a compound selected from the group consisting of tertiary amines and quaternary ammonium salts.

9. The additive of claim 1 wherein the amount of fixed nitrogen is greater than about 0.2%.

10. A papermaking process wherein a cationic starch additive is admixed with a wet mixture comprising pulp, wherein the cationic starch additive is the additive of claim 1; said additive being present in an amount from about 0.1% to about 4% based on the dry weight of the additive with respect to the dry weight of the paper.

11. The process of claim 10 wherein the additive is added in the form of a dilute aqueous solution.

12. The process of claim 11 wherein the solution contains less than about 2% by weight of the additive.

13. The process of claim 12 wherein the solution contains less than bout 1% by weight of the additive.

* * * * *